Jan. 16, 1934.  A. BOUSFIELD  1,943,651
HEALTH SCALE
Filed Dec. 14, 1932  2 Sheets-Sheet 1
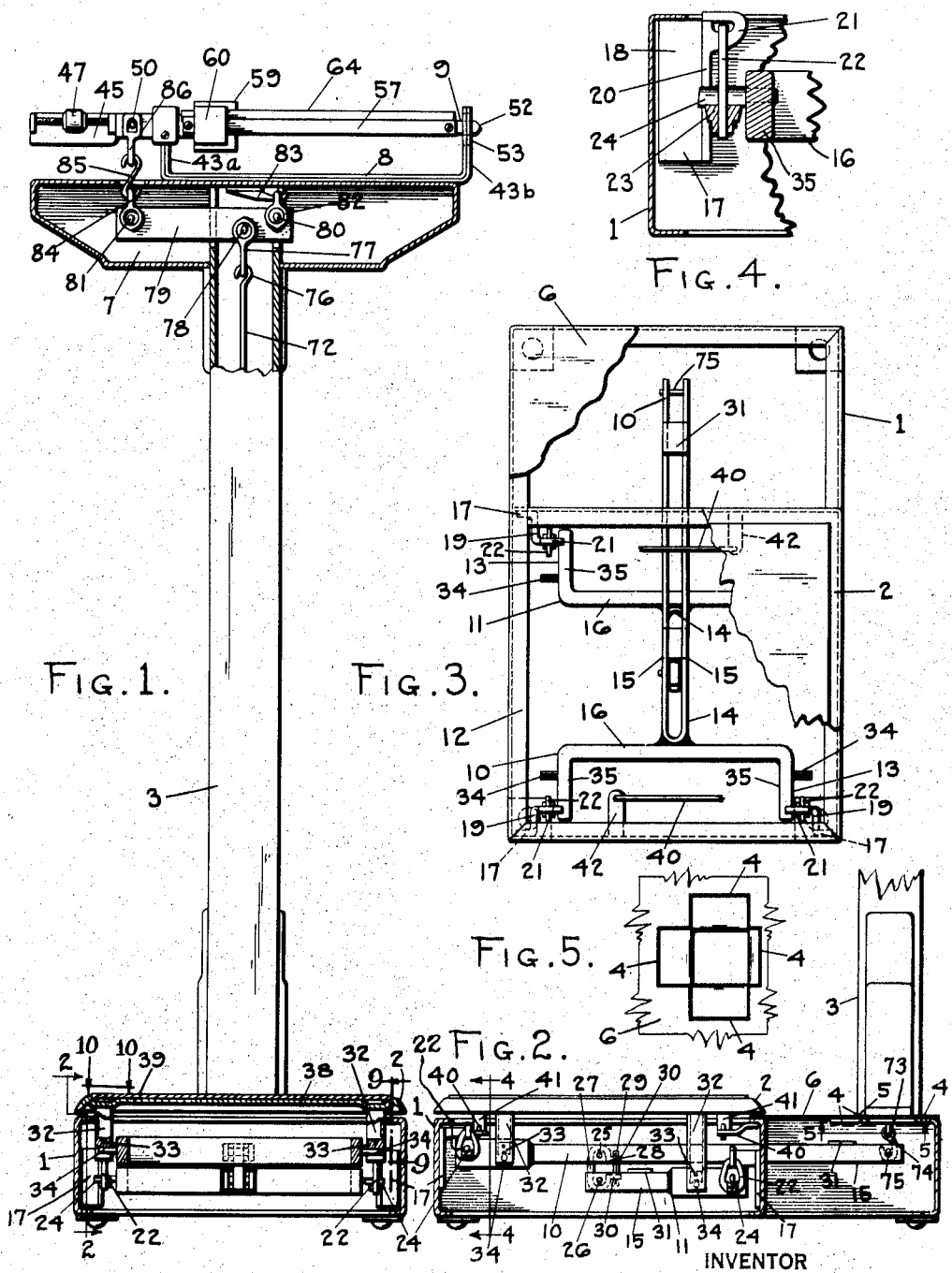
INVENTOR
ALFRED BOUSFIELD
BY
ATTORNEY

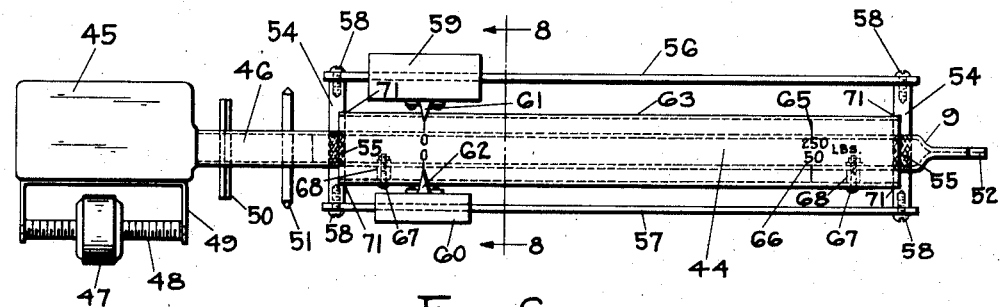

Patented Jan. 16, 1934

1,943,651

UNITED STATES PATENT OFFICE 1,943,651

HEALTH SCALE

Alfred Bousfield, St. Johnsbury, Vt., assignor to E. and T. Fairbanks and Company, St. Johnsbury, Vt., a corporation of Vermont Application December 14, 1932
Serial No. 647,177

19 Claims. (Cl. 265—55)

This invention relates to improvements in weighing scales and more particularly to relatively small platform scales with a full capacity beam, being especially adapted for home use in determining the weight of persons.

An important object of the invention is to provide a scale of the character described, which is accurate and of durable, economical construction, employing mostly pressed sheet steel parts that may be readily and inexpensively formed and assembled, thereby producing a dependable structure that is relatively small in size and light in weight and is consequently adapted to be easily transported and moved.

Another object of the invention is to provide a scale having a lever system with co-operating long and short levers, each formed of a rectangular butt section and a looped section welded thereto and provided with spaced, extended arms.

Another object is to provide suspension bearing means for the levers comprising a bracket formed of one piece of sheet metal, with an extended arm bent around and enclosing a loop, suspended therein.

Another object is to provide a full capacity beam formed of a sheet metal frame having a portion of the counter-balance inserted in the butt end and adapted to securely hold therein the load and fulcrum pivots of the beam.

Another object is to provide the beam with a sheet metal top plate having an inclined face adapted thereby to dispose the face with the graduations thereon at right angles to the direct line of vision of the scale operator.

Another object is to provide means in the form of spaced studs for securely holding the poise bars in fixed, properly spaced position on the beam, together with means for holding the poise bar studs in a fixed position on the ends of the beam frame whereby displacement of the studs will be prevented.

Another object is to provide spacing means for adjusting and holding the beam top plate in proper relative co-operating position with respect to the full capacity and fractional poises.

A further object is to provide means for attaching the spaced arms of the depending platform legs to the platform plate.

Still another object is to provide means for attaching the pillar to the platform housing and to hold it in a vertical position.

In order that the nature of my invention may be fully understood, I have illustrated certain embodiments of the invention in the accompanying drawings, in which,—

Figure 1 is a vertical elevation, partly in section, showing a preferred form of my invention.

Figure 2 is a cross-section on the line 2—2 of Figure 1.

Figure 3 is a plan of the platform housing, partly in section, showing the lever system.

Figure 4 is an enlarged cross-section on the line 4—4 of Fig. 2, showing one of the suspension bearings.

Figure 5 is a plan, partly in section, of a portion of the underside of the platform plate, showing the method of securing the pillar to the platform housing.

Figure 6 is a plan of the scale beam.

Figure 7 is a side view of the scale beam.

Figure 8 is a cross-section on the line 8—8 of Fig. 6 of the scale beam.

Figure 9 is an enlarged vertical cross-section on the line 9—9 of Fig. 1 showing one of the platform legs and the method of attaching the platform legs to the platform.

Figure 10 is an enlarged plan on the line 10—10 of Fig. 1 with the platform cover removed.

Referring to the drawings 1 designates a rectangular platform housing mounted on suitable feet 1a and provided with a vertically movable platform 2 and an upstanding hollow pillar 3, all formed preferably of pressed sheet steel. The pillar 3 is attached to the platform housing 1 at the rear end by flanges 4 extending from each wall of the pillar, which are inserted in an opening 5 in the upper plate 6 of the housing 1, then bent back flush with the upper plate and welded thereto (Figs. 2 and 5). At the upper end of the pillar 3 a horizontal elongated shelf lever housing 7 is attached and is surmounted by a U-shaped beam frame or bracket 8, in which the beam 9 is mounted.

The lever system comprises two co-operating, opposed levers, a long lever 10 and a short lever 11, mounted in a compartment 12 of the platform housing 1, each lever having a rectangular butt section 13 of relatively light metal construction, provided with an elongated looped or U-shaped section 14 with extended, spaced arms 15, and welded at the loop end to the center of the cross-bar 16 of the butt section 13. In each corner of the compartment 12 is attached by welding a lever suspension bracket 17 consisting of a base plate 18 having an upwardly extending portion 19, provided with a laterally extending flange 20 having an extended arm 21 adapted to be inserted in a suspension loop 22 and bent over to loosely enclose the loop, thereby mounting the loop in suspended position. A bearing 23 is mounted in the lower end of the loop 22, in which is seated a knife-edge pivot 24 carried by the adjoining arm of the lever butt section 13. By this arrangement simple means is provided for assembling and suspending the levers in the housing 1. The center connection for the levers 10 and 11 comprises laterally extending and aligned knife-edge pivots 25 and 26 respectively carried thereby and readily inserted in a suspension loop 27 by passing each pivot through a side opening 28 in the loop and thus secured in position by a cotter pin 29 inserted in opposed laterally extending arms 30 of the loop.

The extended arms 15 of the levers 10 and 11 are each provided adjacent to their free ends with an upper plate 31 welded to the arm, for holding the arms in a fixed position.

The platform 2 is provided with depending legs 32 (Figs. 1, 2 and 9), each being formed of a sheet metal plate U-shaped in cross-section and carrying at its lower end a bearing 33, which is seated on a co-operating pivot 34 mounted in the adjacent butt arm 35 of the lever, thereby affording simple support for the platform and ready connection of the platform to the scale levers.

Opposed lugs 36 extending from the upper end of each leg 32 (Figs. 9 and 10) are inserted in slotted openings 36a in depressed portions 37, formed in the upper plate 38 of the platform 2 (Fig. 10), and then bent over and welded to the depressed portions 37, so that the bent over lugs 36 will be flush with the upper surface of the platform plate 38, thereby providing a level surface upon which to mount the platform cover 39.

The usual platform check rods 40 are pivotally connected at one end to spaced depending legs 41, attached and welded to the platform plate 38 in the same manner as the platform legs 32, and likewise pivotally connected at the other end to one of the lateral lugs 42 extending from the end walls of the compartment 12.

The scale beam 9 (Figs. 6, 7 and 8) is mounted above the shelf lever housing 7 and fulcrumed in one of the upstanding spaced arms 43a of the beam frame or bracket 8, which is welded to the housing 7. The beam 9 consists primarily of a pressed sheet metal frame 44, formed into a structure U-shaped in cross-section as shown in Fig. 8, and provided with a solid butt portion 45 forming a counterbalance for the beam, and having a tongue portion 46 inserted in the butt end of the beam frame 44 and welded thereto. A balance ball 47 is adjustably mounted on a threaded rod 48 carried by a bracket 49, which is welded to the counterbalance 45. The tongue portion 46 further serves to provide a solid mounting for and to hold securely the load pivot 50 and fulcrum pivot 51 (Figs. 6 and 7). The beam frame 44 at its free end has its sides brought together and welded, forming thereby a pointed tip 52, for the beam 9, which tip extends through an opening 53 in the outer beam or trig arm 43b. Inserted in aligned openings in the beam frame 44 are spaced studs 54 provided with a knurled center section 55 adapted to engage and closely fit the openings and to be thus held in position. Opposed poise bars 56 and 57 are secured by screws 58 to the ends of the beam studs 54, the bar 56 carrying a full capacity poise 59 and the bar 57 a fractional poise 60, each poise being provided with its particular pointer 61 and 62 respectively. Mounted above the beam frame 44 is a pressed metal top plate or frame 63 (Figs. 6 and 8), U-shaped in cross-section and provided with an inclined or beveled face 64 carrying opposed full capacity graduations 65 and fractional graduations 66, with which the full capacity poise pointer 61 and fractional poise pointer 62 respectively cooperate. By providing the top beam plate 63 with an inclined face 64, the latter with the graduations thereon is placed in a plane at right angles to the direct line of vision of the operator of the scale, whereby the graduations are rendered more clearly visible and consequently more easily read than they would be on a flat plate. The beam top plate 63 is secured to the beam frame 44 by spaced bolts 67 located at each end of the frame adjacent to the fractional poise bar 57 and carrying spacers 68 adapted to hold the sides 69 and 70 of the beam top plate 63 in properly adjusted spaced position with relation to the poise bars and the poises 59 and 60 so as to permit the poises (Figs. 6 and 8) to be readily moved along their respective bars 56 and 57. Moreover, the ends of the beam top plate 63 are inserted and secured in spaced slots 71 in the studs 54, thereby providing means for holding the studs securely in position and preventing their displacement.

The load transmitting mechanism includes a vertically extending steelyard rod 72 (Figs. 1 and 2) located within the pillar 3 and provided at its lower end with an eyelet 73 carrying a hook 74 which engages a knife-edge load pivot 75 mounted in the free end of the long lever 10, while at its upper end the steelyard rod 72 is provided with a hook 76, engaging a loop 77 depending from a knife-edge pivot 78 carried by the shelf lever 79. Disposed above the steelyard rod 72 the shelf lever 79 is provided at one end with a fulcrum knife-edge pivot 80 and at the other end with a load knife-edge pivot 81, by which the shelf lever is suspended from a loop 82, mounted in the bent over arm of a bracket 83 and engaging the fulcrum pivot 80, and a loop 84 engaging the load pivot 81, which loop 84 is in turn suspended from a hook 85 engaging a loop 86 mounted on the load pivot 50 of the beam 9.

While I have shown a preferred embodiment of my invention as exemplified in a health scale it is to be understood that the invention can be readily applied to other similar types of scales, and, further, that modifications of the invention may be made that will come within the scope of the invention and I do not desire, therefore, to be limited to the exact form of construction shown and described herein.

I claim:

1. In a weighing scale, the combination of a plurality of scale levers, a beam connected thereto comprising a pressed sheet metal frame U-shaped in cross-section, and a pressed sheet metal top plate U-shaped in cross-section, mounted above the said beam frame and provided with an inclined face.

2. In a weighing scale, the combination of a plurality of scale levers, a beam connected thereto comprising a pressed sheet metal frame U-shaped in cross-section, and a similar pressed sheet metal top plate U-shaped in cross-section, mounted above the said beam frame in spaced relation thereto and secured to the beam frame by spaced bolts.

3. In a weighing scale, the combination of scale levers, a beam connected thereto and comprising a frame, a top plate U-shaped in cross-section surmounting the beam frame, and having an inclined top face provided with graduations, whereby the graduations are disposed in a plane in direct line of vision of the scale operator.

4. In a weighing scale, the combination of a plurality of scale levers, a beam connected thereto comprising a pressed sheet metal frame U-shaped in cross-section, a pressed sheet metal top plate likewise U-shaped in cross-section, mounted above the said beam frame and disposed with depending sides, spaced studs carried by the said beam frame at each end thereof, the inner stud being provided with spaced slots adapted to receive and hold the ends of the depending top plate sides.

5. In a weighing scale, the combination of a plurality of scale levers, a beam connected thereto comprising a pressed sheet metal frame U-shaped in cross-section, a pressed sheet metal top plate likewise U-shaped in cross-section, mounted above the said beam frame and disposed with depending sides, spaced studs carried by the said beam frame at each end thereof, horizontal opposed poise bars attached to the ends of the said studs carrying full capacity and fractional poises respectively, and spacers mounted on the said bolts adapted to hold the sides of the top plate in properly adjusted spaced relation to the said poise bars.

6. In a weighing scale, the combination of a plurality of scale levers, a beam connected thereto comprising a pressed sheet metal frame U-shaped in cross-section, a counter-balancing butt portion provided with a tongue portion extending into and secured to the said beam frame, and spaced load and fulcrum pivots securely mounted in the said tongue portion.

7. In a weighing scale, the combination of a plurality of scale levers, a beam connected thereto comprising a pressed sheet metal frame U-shaped in cross-section and provided with depending sides having spaced aligned openings, studs inserted in the said beam openings having a knurled center section adapted to closely fit the said openings, whereby the said studs are securely held in the beam frame, and horizontal opposed bars mounted on the ends of the said studs.

8. In a weighing scale, the combination of a plurality of scale levers, a beam connected thereto comprising a pressed sheet metal frame U-shaped in cross-section, a pressed sheet metal top plate likewise U-shaped in cross-section, mounted above the said beam frame and disposed with depending sides, the top plate having an inclined face provided with opposed full capacity and fractional graduations disposed thereby in direct line of vision of the scale operator, spaced studs carried by the said beam frame at each end thereof, horizontal opposed poise bars attached to the ends of the said studs carrying full capacity and fractional poises respectively, and an inwardly extending pointer carried by each poise and co-operating with its respective graduations.

9. In a weighing scale the combination of a housing, weighing mechanism within the housing including opposed levers, each lever being formed with a rectangular butt portion pivotally suspended in the housing, an elongated looped section secured to the center of the butt portion and thereby forming spaced arms extending therefrom, and an upper plate attached to the upper edges of the said arms and adapted to hold them in spaced relation to each other.

10. In a weighing scale the combination of a housing, weighing mechanism within the housing including opposed levers, each lever being formed with a rectangular butt portion pivotally suspended in the housing, an elongated looped section secured to the center of the butt portion and thereby forming spaced arms extending therefrom, spaced and aligned pivots mounted in the said arms, a suspension loop mounted on the said pivots and provided with a side opening through which the said pivots are adapted to be passed to their operative position, and means for closing the said opening.

11. In a weighing scale the combination of a housing, weighing mechanism within the housing including opposed levers, each lever being formed with a rectangular butt portion pivotally suspended in the housing, an elongated looped section welded to the center of the butt portion and thereby forming spaced arms extending therefrom, a platform surmounting the housing and adapted to co-operate with and actuate the weighing mechanism, and pivotally mounted check rods disposed between the housing and the said platform.

12. In a weighing scale the combination with a housing, of a platform mounted above the housing having primarily an upper plate, provided in each corner with a depending platform supporting leg U-shaped in section secured to spaced depressed portions in the said plate, and laterally extending attaching means integral with the said leg and co-operating with the depressed portions for attaching the said leg thereto.

13. In a weighing scale the combination with a housing, of a platform mounted above the housing having primarily an upper plate, provided in each corner with spaced depressed portions each having a slotted opening therein, and a depending platform supporting leg U-shaped in section, each platform leg being provided with opposed upwardly extending attaching lugs adapted to be inserted in the said slotted openings, bent over and welded to the co-operating depressed portion, flush with the upper surface of the said platform plate.

14. In a weighing scale the combination of a housing, weighing mechanism within the housing, and means for suspending the weighing mechanism including a bracket located at each corner of the said housing and provided with an upstanding portion having an extended arm adapted to be inserted in a suspension loop and bent over so as to enclose the said loop within the bent over extended arm.

15. In a weighing scale the combination of a housing, weighing mechanism within the housing, and means for suspending the weighing mechanism including a bracket located at each corner of the said housing and provided with an upstanding portion having an extended arm adapted to be inserted in a suspension loop and bent over so as to enclose the said loop within the bent over extended arm, the said loop carrying a bearing in which is seated a pivot carried by the weighing mechanism.

16. In a weighing scale the combination of a housing, weighing mechanism within the housing, and means for suspending the weighing mechanism including a bracket located at each corner of the said housing and provided with a base plate, an upstanding portion with a lateral flange, from which extends an arm adapted to be inserted in a suspension loop and looped to enclose and suspend the said loop therefrom, a bearing mounted in the lower end of the said loop and pivotally connected to the weighing mechanism.

17. In a weighing scale the combination with a housing, of a sheet metal rectangular pillar extending upwardly therefrom and having a flange projecting from each of its walls at its lower end, and an upper plate on the said housing provided with an opening to receive the said flanges adapted to be bent over and welded to the under side of the upper plate.

18. In a weighing scale the combination with a housing, of a sheet metal rectangular pillar vertically mounted on the housing, and a sheet metal elongated horizontal housing attached to the upper end of the said pillar which extends to and abuts the top plate of the said horizontal housing.

19. In a weighing scale the combination of a housing, weighing mechanism within the housing, a hollow vertical pillar leading from the said housing, a horizontal housing mounted on the upper end of the said pillar, a beam fulcrumed above and mounted on the said horizontal housing, and load transmitting mechanism including a vertically extending steelyard rod within the pillar and carrying at its lower end a hook engaging a load pivot carried by the weighing mechanism, and at its upper end a hook engaging a loop carried by a shelf lever, pivotally suspended from the said beam and the looped arm of a sheet metal bracket attached to the said horizontal housing.

ALFRED BOUSFIELD.